US012699052B2

(12) United States Patent
Schnitzer et al.

(10) Patent No.: US 12,699,052 B2
(45) Date of Patent: Aug. 4, 2026

(54) APPARATUS AND METHOD FOR MULTIPLEXED ONE-PHOTON AND NONLINEAR MICROSCOPY AND METHOD FOR BIOLOGICAL TISSUE ALIGNMENT

(71) Applicant: The Board of Trustees of the Leland Stanford Junior University, Stanford, CA (US)

(72) Inventors: Mark J. Schnitzer, Stanford, CA (US); Radosław Chrapkiewicz, Sunnyvale, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 238 days.

(21) Appl. No.: 18/718,848

(22) PCT Filed: Dec. 13, 2022

(86) PCT No.: PCT/US2022/052712
§ 371 (c)(1),
(2) Date: Jun. 12, 2024

(87) PCT Pub. No.: WO2023/114213
PCT Pub. Date: Jun. 22, 2023

(65) Prior Publication Data
US 2025/0067672 A1     Feb. 27, 2025

Related U.S. Application Data

(60) Provisional application No. 63/288,839, filed on Dec. 13, 2021.

(51) Int. Cl.
*G01N 21/64*     (2006.01)
*G01J 3/02*     (2006.01)
(Continued)

(52) U.S. Cl.
CPC .......... *G01N 21/6458* (2013.01); *G01J 3/021* (2013.01); *G01J 3/0289* (2013.01);
(Continued)

(58) Field of Classification Search
CPC ... G01N 21/6458; G01N 21/636; G01J 3/021; G01J 3/0289; G01J 3/08; G01J 3/10;
(Continued)

(56) References Cited

U.S. PATENT DOCUMENTS

2008/0304046 A1*  12/2008  Lee .................... G01N 21/1717
                                                          356/51
2013/0155413 A1*   6/2013  Liesener ............ G01B 11/2441
                                                          356/479
(Continued)

OTHER PUBLICATIONS

Flusberg, Benjamin A., et al. "Fiber-optic fluorescence imaging." Nature methods 2.12 (2005): 941-950. (Year: 2005).*
(Continued)

*Primary Examiner* — Dominic J Bologna
(74) *Attorney, Agent, or Firm* — LUMEN PATENT FIRM

(57)          ABSTRACT

We combine linear and nonlinear microscopy modalities. This approach is capable of imaging a sample using the two modalities concurrently, generating time sequences of images of the sample having different properties characteristic of each of the modalities. We can separate light emitted from the sample, generated by either modality, even if the spectrum of light is identical for each modality. The nonlinear microscopy modality allows one to create high resolution volumetric images of the sample. The concurrent imaging of the sample using linear and nonlinear microscopy modalities enables one to correlate a spatial structure and temporal dynamics of the sample acquired in each modality allowing one to create a mapping between images across the modalities. The created mapping can be used to match images of a tissue sample acquired using linear
(Continued)

modality in a living organism with high resolution, two- or three-dimensional images obtained using nonlinear microscopy modality.

15 Claims, 12 Drawing Sheets

(51) Int. Cl.

| | |
|---|---|
| *G01J 3/08* | (2006.01) |
| *G01J 3/10* | (2006.01) |
| *G01J 3/44* | (2006.01) |
| *G01N 21/63* | (2006.01) |
| *G02B 21/00* | (2006.01) |
| *G02B 21/16* | (2006.01) |
| *G02B 21/18* | (2006.01) |
| *G02B 21/36* | (2006.01) |
| *G02B 27/10* | (2006.01) |

(52) U.S. Cl.
CPC . *G01J 3/08* (2013.01); *G01J 3/10* (2013.01); *G01J 3/4406* (2013.01); *G01N 21/636* (2013.01); *G02B 21/0044* (2013.01); *G02B 21/0076* (2013.01); *G02B 21/008* (2013.01); *G02B 21/16* (2013.01); *G02B 21/18* (2013.01); *G02B 21/361* (2013.01); *G02B 21/367* (2013.01); *G02B 27/1066* (2013.01); *G01J 2003/102* (2013.01); *G02B 2207/114* (2013.01)

(58) Field of Classification Search
CPC .............. G01J 3/4406; G01J 2003/102; G02B 21/0044; G02B 21/0076; G02B 21/008; G02B 21/16; G02B 21/18; G02B 21/361; G02B 21/367; G02B 27/1066; G02B 2207/114

See application file for complete search history.

(56) References Cited

U.S. PATENT DOCUMENTS

| | | | | |
|---|---|---|---|---|
| 2015/0276483 A1* | 10/2015 | Mikami | .................... | G01J 3/44 |
| | | | | 356/301 |
| 2017/0010453 A1* | 1/2017 | Imoto | ................ | G02B 21/0076 |
| 2019/0154583 A1* | 5/2019 | Hirai | ........................ | G01J 3/10 |

OTHER PUBLICATIONS

Barson et al., "Simultaneous mesoscopic and two-photon imaging of neuronal activity in cortical circuits", 2002, Nature Methods, vol. 17, 107-113.

Parodi et al., "Nonlinear Optical Microscopy: From Fundamentals to Applications in Live Bioimaging", 2020, Frontiers in Bioengineering and Biotechnology, vol. 8, Article 585363.

Mazumder et al., "Label-Free Non-linear Multimodal Optical Microscopy-Basics, Development, and Applications", 2019, Frontiers in Physics, vol. 7, Article 170.

Hamel et al., "Cellular Level Brain Imaging in Behaving Mammals: An Engineering Approach", 2015, Neuron v86, 140-159.

Kim et al., "Fluorescence imaging of large-scale neural ensemble dynamics", Jan. 2022, Cell v185, 9-41.

Helmchen et al., "Deep tissue two-photon microscopy", 2005, Nature Methods vol. 2 No. 12, 932-940.

Aldridge et al., "Single cell transcriptomics comes of age", 2020, Nature Communications 11:4307, 1-4.

Palla et al., "Spatial components of molecular tissue biology", 2022, Nature Biotechnology, vol. 40, 308-318.

\* cited by examiner

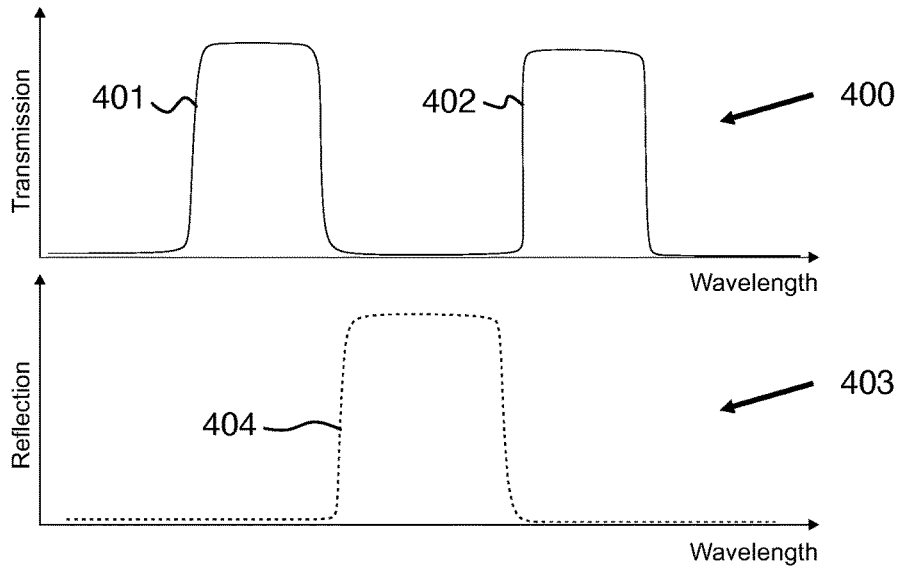
FIG. 4
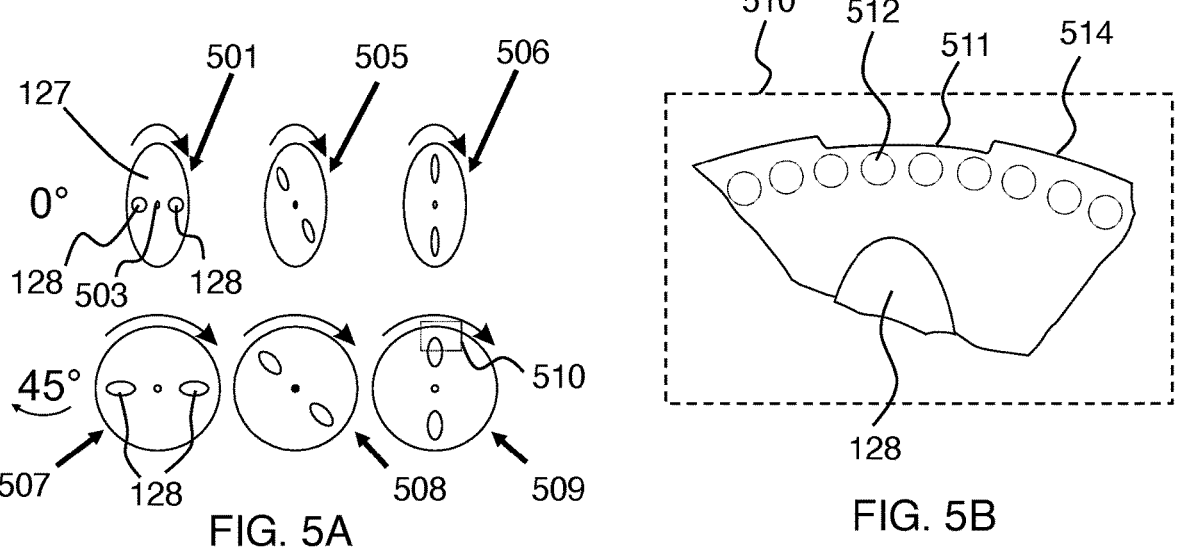
FIG. 5A
FIG. 5B

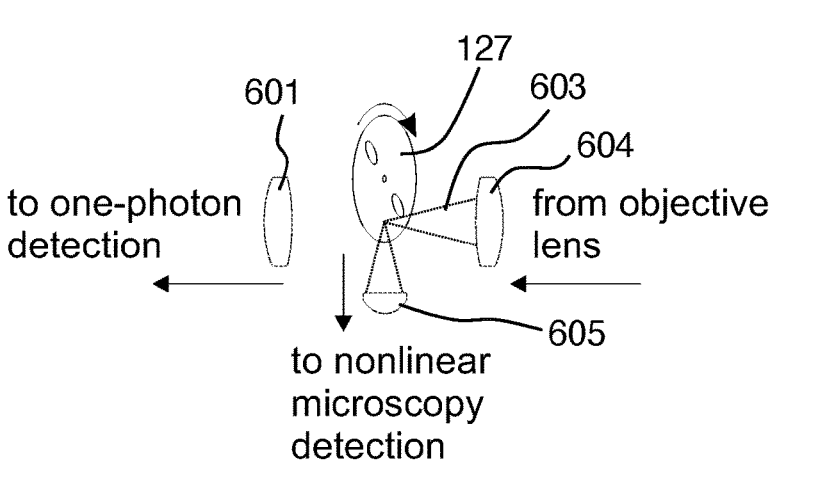
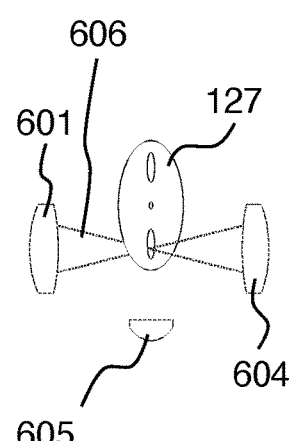
FIG. 6A
FIG. 6B
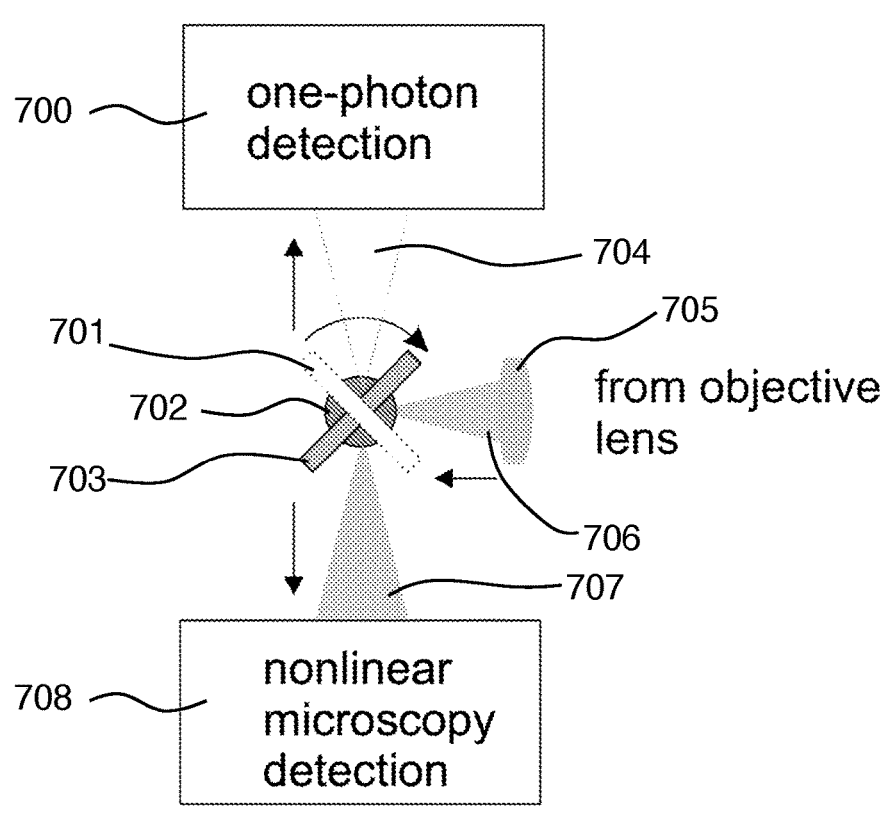
FIG. 7

$(xi,yi,zi)$     $(x'i,y'i,z'i)$

APPARATUS AND METHOD FOR MULTIPLEXED ONE-PHOTON AND NONLINEAR MICROSCOPY AND METHOD FOR BIOLOGICAL TISSUE ALIGNMENT

FIELD OF THE INVENTION

This invention relates to microscopy, especially in connection with biomedical imaging, biology, and spatial biology.

BACKGROUND

Optical imaging of biological tissues is vital to understanding the morphology and dynamical changes of living organisms. Optical imaging can be minimally- or non-invasive and can be used to image live tissues and living organisms. The most popular method to obtain contrast in optical imaging is to use fluorescent labeling that uses two different parts of the light spectrum to illuminate and collect light from the sample. For biological applications, it is particularly important to achieve spatial resolution high enough to distinguish individual cells in the tissue and their morphological structures.

One known imaging modality is one-photon fluorescence microscopy. This technique typically utilizes an incoherent source of light, a set of filters to narrow down an excitation spectrum, an objective lens that is used to guide an excitation light as well as collect light from the tissue and form the image, a tube lens, and a camera. More light sources and cameras can be used to create images in different spectral channels. Also, spatially structured color filters can be used with cameras to obtain images with multiple color channels. One-photon microscopy applied for imaging of biological tissues typically offers a large field of view and the size of the apparatus can be scaled, making it suitable for miniaturization. Thick biological samples may not be entirely transparent and the capability of imaging is limited by the scattering length of the tissue. One-photon microscopy can be used for imaging such samples but as it collects light generated from the out-of-focus part of the tissue that may undergo a scattering, the resulting image quality may suffer, in terms of the resolution and the contrast. Also, one-photon imaging typically produces two-dimensional images without exact information about the depth of the imaged object. On the other hand, large fields-of-view can typically be acquired and if the application of interest is to image cells in the tissue, a large number of cells can be imaged concurrently.

Another known imaging modality is nonlinear microscopy techniques. This class of microscopy techniques uses a pulsed laser as a source of illumination that is focused in a tissue. A focused beam creates a high intensity of light that can induce some nonlinear optical effects such as two-, three-photon absorption, second or third harmonic generation, and others. A light generated in such a process has a shorter wavelength than the excitation light and can be separated from the excitation light using optical filters. A laser beam is steered across the sample and its position in time is used to computationally create two or three-dimensional images of the sample. Light generated in the process is highly localized due to the nonlinear nature of the process, and nonlinear microscopy techniques are not very sensitive to tissue scattering, unlike the one-photon modality. Light generated in the sample is collected on one or more sensitive detectors such as photomultiplier tubes, that contain at least one active detection area. The resulting images have a high three-dimensional resolution, imaging can be performed at large tissue depths. Setups for nonlinear microscopy are typically large, requiring pulsed lasers. Also, the laser scanning methods are typically slower than the acquisition rates of cameras.

These two techniques are among the most popular methods for in vivo and ex vivo fluorescent microscopy but using one at a time limits the user in certain ways. For instance, one-photon imaging suffers from low contrast, modest resolution, and modest depth of tissue penetration, while all of these parameters are significantly better in two-photon imaging. On the other hand, two-photon imaging has typically a limited field-of-view and it is hard to miniaturize. As a consequence, the user typically chooses one of two techniques at a time thus making a certain trade-off. Very often users start in vivo imaging using the one-photon technique due to its portability and/or the large field of view but then they want to study the tissue in a more detailed manner using two-photon imaging. In such a case, cross-modality alignment becomes a serious challenge, and often finding the same fragment of tissue such as particular cells of interest becomes impossible as the one-photon imaging lacks a sufficient three-dimensional resolution.

Accordingly, it would be an advance in the art to provide multiplexing of fluorescence microscopy and nonlinear microscopy, with applications including, but not limited to alignment of tissue samples that is enabled by such multimodality tissue imaging.

SUMMARY

The present approach provides multiplexing and demultiplexing of different modalities of imaging which is part of optics, microscopy, and biomedical imaging fields. The application of the apparatus and the method of biological tissue alignment is a tool to be used in biology, spatial biology, spatial omics, spatial genomics, spatial transcriptomics, spatial multiomics, neuroscience, oncology as it allows to create a mapping between imaging using one-photon microscopy that can be used in a variety of environments, such as directly in living tissues and organisms, and high-resolution imaging that can be created in the laboratory setting and that is required to be used with spatial biology assays. A preferred embodiment of the method of tissue alignment is in the field of neuroscience.

This approach solves the problems of cross-modality alignment and the necessity of choosing one of the techniques at a time by combining one-photon and nonlinear microscopy in one single device, operating them nearly simultaneously using fast temporal multiplexing.

Another class of problem solved by the present approach is the alignment of the wide field in vivo imaging data to ex vivo spatially resolved RNA and proteomics datasets. Data collected in the in vivo experiment usually needs to be collected with a widefield, one-photon imaging technique that does not provide enough spatial resolution to be aligned with ex vivo imaging resolving each cell both spatially as well as in terms of its genetic identity. Temporally multiplexed one-photon and nonlinear microscopy serve as an intermediate alignment tool providing a spatial 3d mapping between in vivo and ex vivo data. In the specific embodiment where we apply the apparatus for functional imaging of neural ensembles, we additionally solve the above problems in the context of neurons' identity, the morphology of neurons, and fidelity of the time traces of genetically encoded calcium indicators expressed in these neurons.

BRIEF DESCRIPTION OF THE DRAWINGS

FIG. 4 shows a preferred configuration of the dichroic mirror that separates signal light from source light at the main objective.

FIG. 5A-B show some optional details of the spinning mirror.

FIGS. 6A-B show operation of a demultiplexer based on a spinning mirror.

FIG. 7 shows a demultiplexer based on a large-amplitude galvanometric mirror.

FIG. 17 shows how depth information can be used to know which slice of a sliced sample identified cells are in.

DETAILED DESCRIPTION

A) Overview

Embodiments of the invention include multiplexing and demultiplexing of two microscopy modalities (e.g., as on FIGS. 3A-B), the corresponding apparatus (e.g., FIG. 1), spectral multiplexing (e.g., as on FIG. 4) and various method of demultiplexing (e.g., as on FIGS. 5A-9). Embodiments of the invention also include methods for application of the apparatus for alignment of tissue images acquired from different modalities. Here a linear microscope is any microscope where the output image is formed via optical processes that are linear (e.g., scattering, linear fluorescence), and a nonlinear microscope is any microscope where the output image is formed via optical processes that are nonlinear (e.g. two-photon fluorescence, multi-photon fluorescence, etc.)

Figure 1:
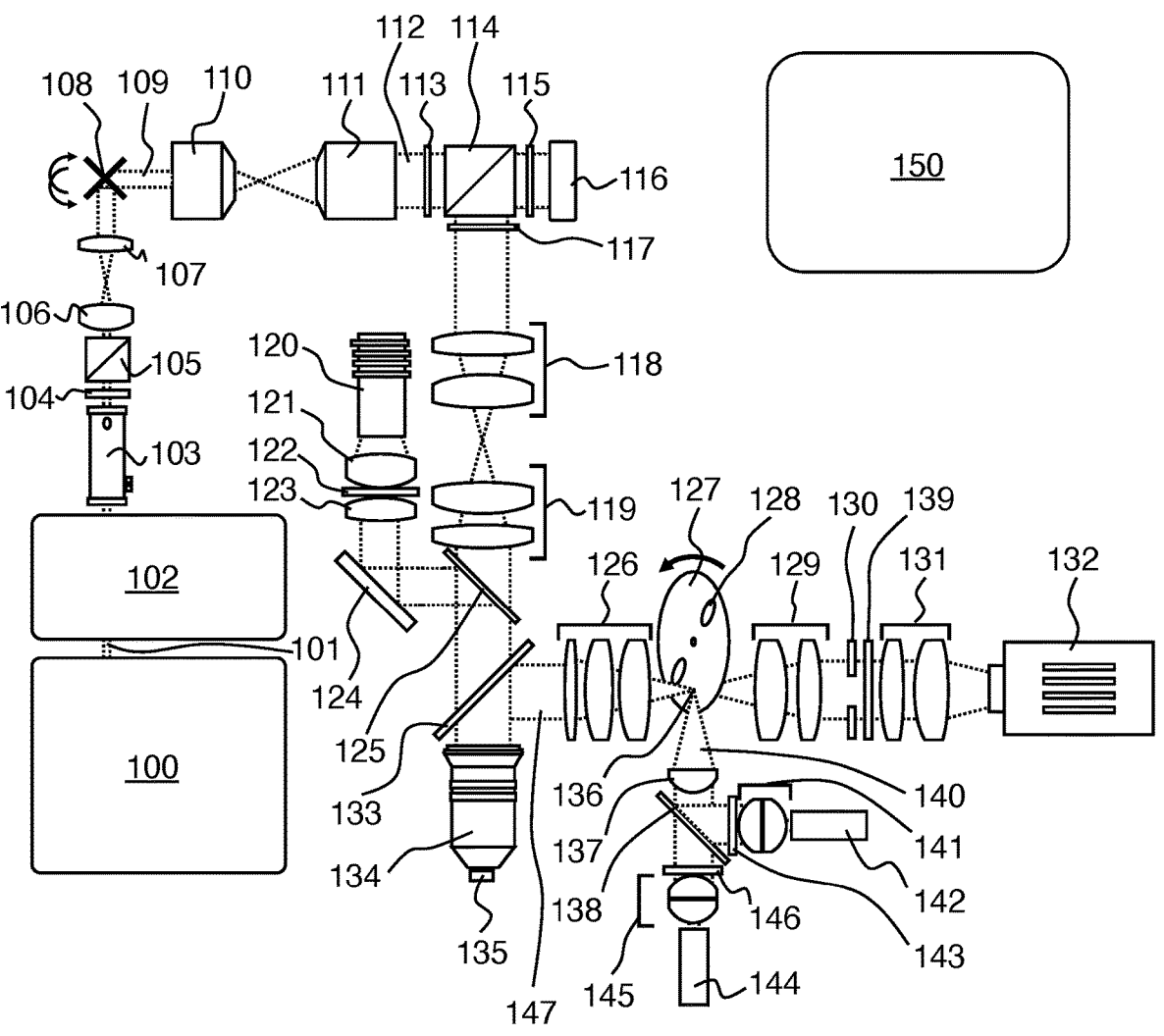
FIG. 1 shows an exemplary embodiment of the invention.

B) Exemplary System (FIG. 1)

Figure 3A:
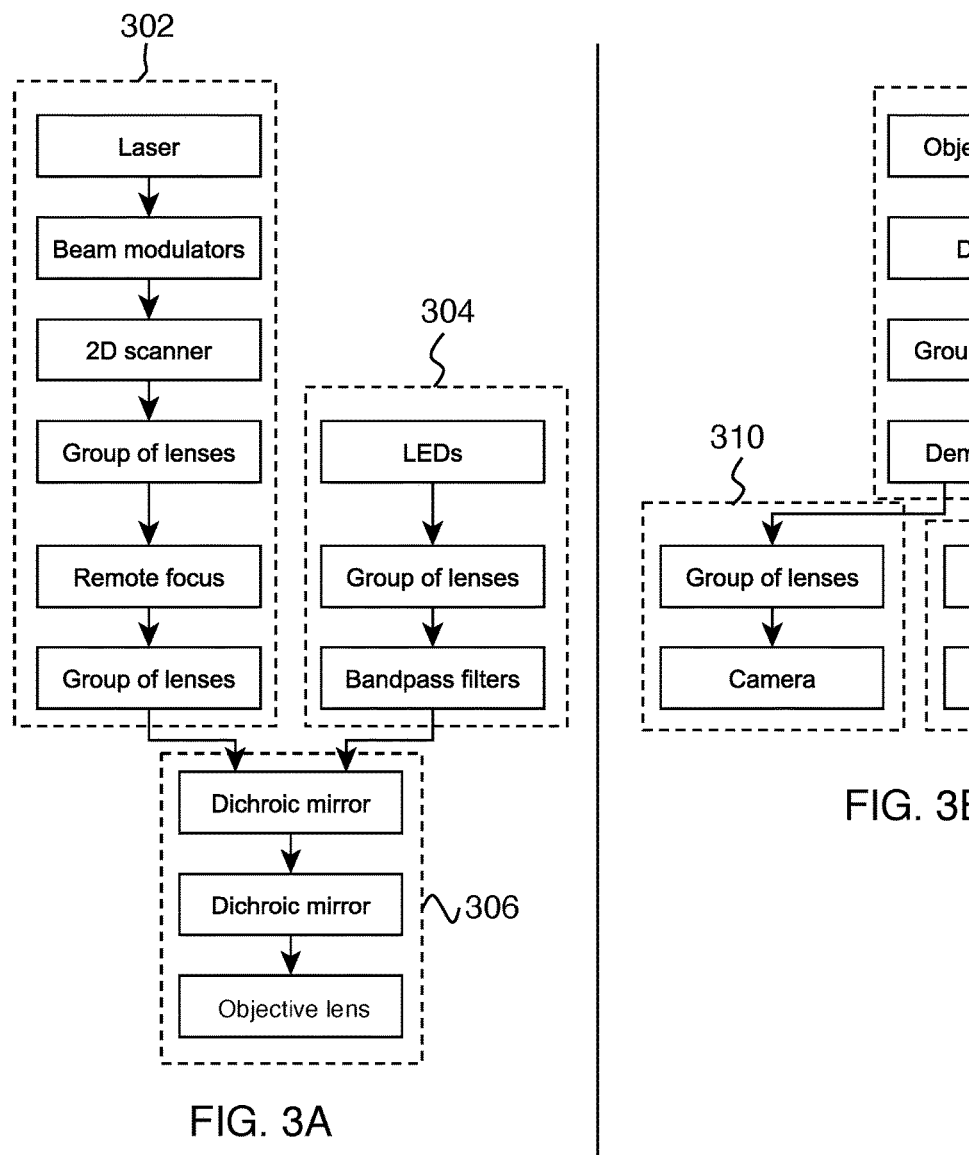
FIGS. 3A-B are block diagrams of source and signal subsystems.
Figure 3B:
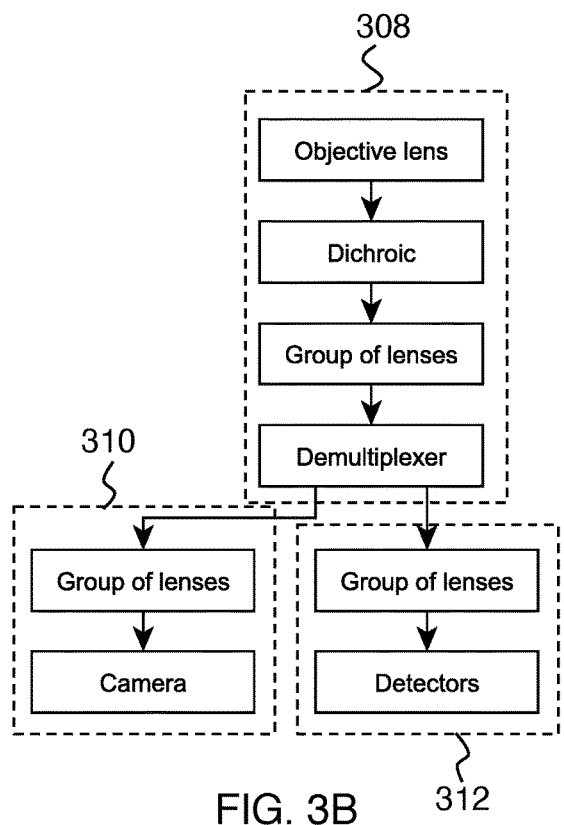

To better appreciate the exemplary system of FIG. 1, it is helpful to begin with the block diagram of FIGS. 3A-B. FIG. 3A shows spectral multiplexing of a nonlinear source beam path 302 and a linear source beam path 304 onto a common source beam path 306. FIG. 3B shows demultiplexing of a common signal beam path 308 into a linear signal beam path 310 and a nonlinear signal beam path 312.

On FIG. 1, the linear source beam path includes components 120, 121, 122, 123, and 124. The nonlinear source beam path includes components 100, 102, 103, 104, 105, 106, 107, 108, 110, 111, 113, 114, 115, 116, 117, 118, and 119. The common source beam path includes components 125, 133, 134, and the sample 135. The common signal beam path includes sample 135 and components 134, 133, 126, and 127. The linear signal beam path includes components 129, 130, 139, 131, and 132. The nonlinear signal beam path includes components 137, 138, 141, 142, 143, 144, 145, and 146. These six beam paths will be described in the following paragraphs.

The linear source beam path includes light emitting diode 120, collimating lens 121, bandpass filter 122, focusing lens 123, and mirror 124.

The nonlinear source beam path includes pulsed laser 100, dispersion compensation unit 102, beam modulator 103, half wave plate 104, polarization beam splitter 105, first beam expander lens or group of lenses 106, second beam expander lens or group of lenses 107, set of galvanometric mirrors 108, scan lens having one or more lenses 110, tube lens having one or more lenses 111, half-wave plate 113, polarization beam splitter 114, quarter-wave plate 115, deformable mirror 116, half-wave plate 117, first group of lenses of the optical relay 118, and second group of lenses of the optical relay 119. Here elements 113, 114, 115, 116, and 117 provide a remote focusing capability as described in greater detail below. Elements 108, 110 and 111 implement 2-D scanning for the nonlinear microscope.

Laser 100 is preferably a pulsed laser of pulse energies sufficient to induce nonlinear effects in a sample. It is preferably an infrared femtosecond laser, optical parametric amplifier, optical parametric oscillator, or a q-switched laser. The pulse repetition rates of the laser are between 50 kHz-1 GHz, and preferably in a range of 1-160 MHz. The pulse duration of the laser is between 100 ps-5 fs, preferably 50-300 fs.

The common source beam path includes long-pass dichroic beam splitter 125, dichroic beam splitter 133, objective lens 134, and the sample 135. Here dichroic beam splitter 125 is for combining the linear and nonlinear excitations on the common source beam path, while dichroic beam splitter 133 serves to separate the signal fluorescence (both linear and nonlinear) from the linear and nonlinear excitations, as described below in connection with FIG. 4. Light from each excitation source enters the tissue through objective lens 134 of a numerical aperture (NA) between 0.05-1.45, preferably, between 0.5-1.2, that allows efficient collection of photons generated in nonlinear microscopy as well as provides resolution high enough to distinguish morphological features of individual cells in this modality.

Light generated in one-photon fluorescence as well as the corresponding physical processes characteristic for nonlinear microscopy, preferably two-photon fluorescence, is collected by the same objective lens 134. Fluorescence light can share the same spectrum across microscopy modalities, but it cannot significantly overlap with the spectrum of excitation light. Fluorescence light is separated from the excitation light by a dichroic mirror 133 placed in proximity to objective lens 134, covered with a dielectric stack designed to reflect the emitted fluorescence light spectrum and transmit the excitation light as shown. Then the fluorescence light is collected by a group of lenses 126 that create a sample image plane 136.

The common signal beam path includes sample 135, objective lens 134, dichroic beam splitter 133, fluorescence collection lenses 126, and spinning mirror with cut-outs 127. The demultiplexing of linear and nonlinear signals in this example is performed by spinning mirror 127. Spinning mirror 127 includes one or more cutouts 128, and when a cutout 128 is in the beam path, the signal light passes through the cutout and is received by the linear signal beam path components. When a cutout 128 is not in the beam path, the signal light is reflected from spinning mirror 127 to be received by the nonlinear signal beam path components. Spinning mirror 127 is preferably disposed to coincide with sample image plane 136.

The linear signal beam path includes group of lenses for collimating one-photon fluorescence 129, iris diaphragm 130, bandpass filter 139, group of lenses for creating an image of one photon fluorescence 131, and camera 132.

The nonlinear signal beam path includes lens 137, dichroic beam splitter 138, group of lenses 141, photomultiplier tube 142, bandpass filter 143, photomultiplier tube 144, group of lenses 145, and bandpass filter 146. Here two spectral channels are shown for the nonlinear microscope, but the nonlinear microscope could optionally have just a single spectral channel or more than two spectral channels.

Further points of reference on FIG. 1 are laser beam 101, enlarged laser beam 109, magnified laser beam 112, two-photon fluorescence light 140, signal light 147 and microscope controller 150. Microscope controller 150 can include electronics as shown on FIG. 12, and at least demultiplexes the two beam paths to provide co-aligned linear and non-linear microscopy. For simplicity, connections between controller 150 and other components of the system are not shown on FIG. 1.

The example of FIG. 1 includes numerous optional features of preferred embodiments, so it is worthwhile to explicitly identify a more general embodiment. One such embodiment is apparatus including a linear optical microscope and a nonlinear optical microscope. The linear optical microscope has a first optical beam path from a first source to a first detector, and is configured to provide a first image of a sample. The nonlinear optical microscope has a second optical beam path from a second source to a second detector and is configured to provide a second image of the sample. The first optical beam path and the second optical beam path overlap each other in part such that the first image of the sample and the second image of the sample are inherently co-aligned to each other. The overlapping part of the first optical beam path and the second optical beam path includes a common objective lens for linear and nonlinear imaging (e.g., 134 on FIG. 1). The apparatus includes a microscope controller configured to demultiplex the first optical beam path and the second optical beam path, in order to provide co-aligned linear and nonlinear optical microscopy of the sample. Here "optical" is taken to include the visible spectrum along with adjacent parts of the infrared and ultraviolet spectrums for which optical technology (lenses etc.) work. The corresponding wavelength range can be taken to be 200 nm to 2 μm, and is more preferably from 680 nm to 1300 nm.

C) Features of the Example of FIG. 1 (FIGS. 2A-B, 3A-B)

Figures 2A, 2B:
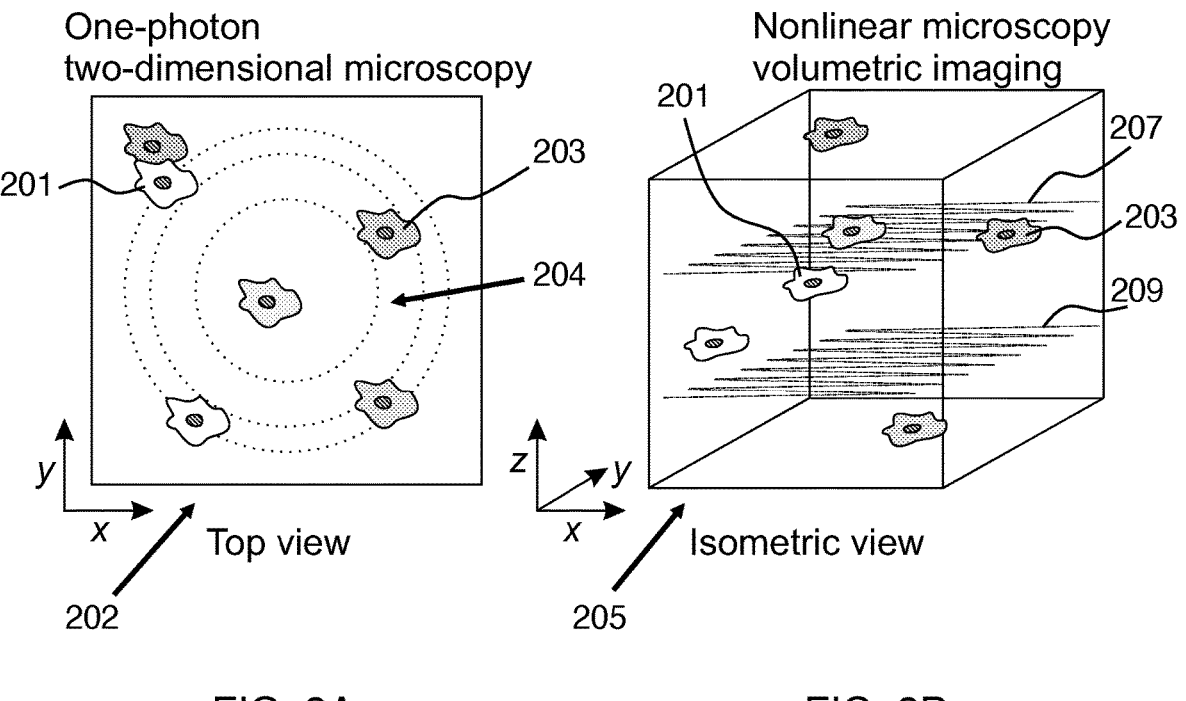
FIGS. 2A-B show 2-D one-photon microscopy compared to 3-D nonlinear microscopy.

FIGS. 2A-B show basic geometrical properties of one-photon (FIG. 2A) and volumetric imaging using nonlinear microscopy (FIG. 2B) of the same population of cells. Here 201 is a representation of an active cell emitting bright florescence light, 202 is a field of view of one-photon microscopy, 203 is an example of a dark, inactive cell, 204 is the LED illumination pattern, 205 is the volume sampled by nonlinear microscopy, 207 is a simplified scanning pattern of a laser beam in one plane, and 209 is a laser scanning pattern of another, deeper plane inside a tissue.

FIG. 3A is a block diagram of an exemplary subsystem of the excitation pathway of the apparatus. FIG. 3B is a block diagram of an exemplary subsystem of the collection optical path. On FIG. 3A, two excitation pathways are combined spatially on a dichroic mirror (spectral multiplexing of a nonlinear source beam path 302 and a linear source beam path 304 onto a common source beam path 306). On FIG. 3B both modalities excite fluorescence of the same or similar spectral properties and they are separated out using spatial and temporal demultiplexing (demultiplexing of a common signal beam path 308 into a linear signal beam path 310 and a nonlinear signal beam path 312).

D) Spectral Multiplexing (FIG. 4)

FIG. 4 shows an exemplary transmission and reflection spectrum of dichroic mirror 133. Here 400 is a transmission spectrum plot with a qualitatively depicted transmission coefficient vs. wavelength, 401 is a transmission band for one-photon excitation, 402 is a transmission band for nonlinear microscopy excitation, 403 is a reflection spectrum plot with a qualitatively depicted reflection coefficient vs. wavelength, and 404 is a band of high-reflection for fluorescence light.

Spectral multiplexing occurs before objective lens 134 using a dichroic mirror 125. In the preferred embodiment, the incoherent light from a light emitting diode (LED) 120 is reflected from the dichroic beam splitter 125 towards objective lens 134 whereas infrared light from a femtosecond laser 100 is passed through the dichroic beam splitter 125 (e.g. as shown on FIG. 1). This is why is it preferred for dichroic beam splitter 133 to have two transmission bands as shown on FIG. 4.

E) Spinning Mirror Demultiplexer (FIGS. 5A-B, 6A-B)

FIG. 5A shows several views of spinning mirror 127. Here views 501, 505, 506 are views at three different rotation phases at 45 degrees to the mirror axis of rotation (i.e., a view along the optical beam path) and views 507, 508, 509 are three corresponding views along the mirror's axis of rotation. Feature 503 is an optional cut-out for mounting the spinning mirror. FIG. 5B is an enlarged view of section 510 on FIG. 5A. Here 511 is an optional edge-mirror cut-out for optical detection of the phase of one-photon modality and 512 is an optional hole pattern having the same or similar holes that could be circular, rectangular or having other arbitrary geometrical shapes that allow for a precise phase detection of the rotation.

In the preferred embodiment, the spatial demultiplexer is a spinning mirror disk 127 with cut-out holes 128 whose purpose is to pass the fluorescence light generated in one-photon fluorescence, e.g., as shown on FIG. 1. The hole pattern is matching the size of the field of view after an angular projection, as shown on FIG. 5A. The disk is covered with a reflective material such as metallic coating, preferably silver, aluminum, or gold, or dielectric mirror coating or it is made out of a polished metallic surface. The mirror disk spins in synchrony to the sequence (FIG. 9) of interleaving between one-photon and nonlinear microscopy in such a way that a hole is aligned to the image plane (FIGS.

6A-B) when a one-photon phase is active and the mirror surface is overlapping with the image plane 136 when a nonlinear microscopy phase is active. In the latter phase, the light is reflected towards detectors used for nonlinear microscopy whose surfaces are preferably placed in the proximity of the far-field plane of the image after passing through a group of lenses and filters. The light passing through a hole 128 is entering the camera 132 through a group of lenses 129, 131 and filters 139.

The materials for the spinning mirror 127 are preferred to be polycarbonate, plastic, glass, or silicon. The cut-out holes can be machined using mechanical or laser tools and the reflective mirror surface is obtained preferably through coating in an evaporation chamber. In a preferred method of creating the spinning disk, a substrate of the wafer is cut using a pulsed laser that is focused within the substrate. The substrate is moved in x and y dimensions in synchrony with the shutter of the laser beam to create a pattern of cut-outs corresponding the design. The laser focus can move in the z direction which is perpendicular to the surface of the sub-strate. The pulsed laser is preferred to be a pico-, or femtosecond laser and the cutting is achieved through a nonlinear damage introduced by the laser. It is preferred to cut spinning disks from hardened glass. After cutting the disks are cleaned from all debris and any deposition residu-als, especially fat particles. After cleaning, spinning disks are inserted into a vacuum chamber where evaporation deposition occurs. It is preferred to deposit metallic or dielectric stack on top of the substrate surface to achieve high-reflectivity of the spinning mirror surface.

The mirror 127 can be driven to rotate using an electric motor, preferably a direct current motor whose velocity and phase can be stabilized using a feedback signal 1202. A feedback signal is preferably obtained using second small hole pattern 512 on the edge of the mirror whose position is sensed using a detector, preferably an optical detector using a diode, a laser diode, and a photodiode. Additional holes or cut-outs 511 close to an edge 514 are marking the positions of the cutouts 128 for the one-photon fluorescence light 606.

FIGS. 6A-B show operation of the spatial demultiplexer of FIGS. 5A-B in the nonlinear microscopy part of the sequence (FIG. 6A) and the one-photon microscopy part of the sequence (FIG. 6B). Here 601 is a lens or group of lenses, 603 is a fluorescence light excited in nonlinear microscopy and reflected from spinning mirror 127, 604 is a lens or group of lenses, 605 is another lens or group of lenses, and 606 is a fluorescence light excited in one-photon fluorescence microscopy that is passing through a cut-out in spinning mirror 127.

Figure 8:
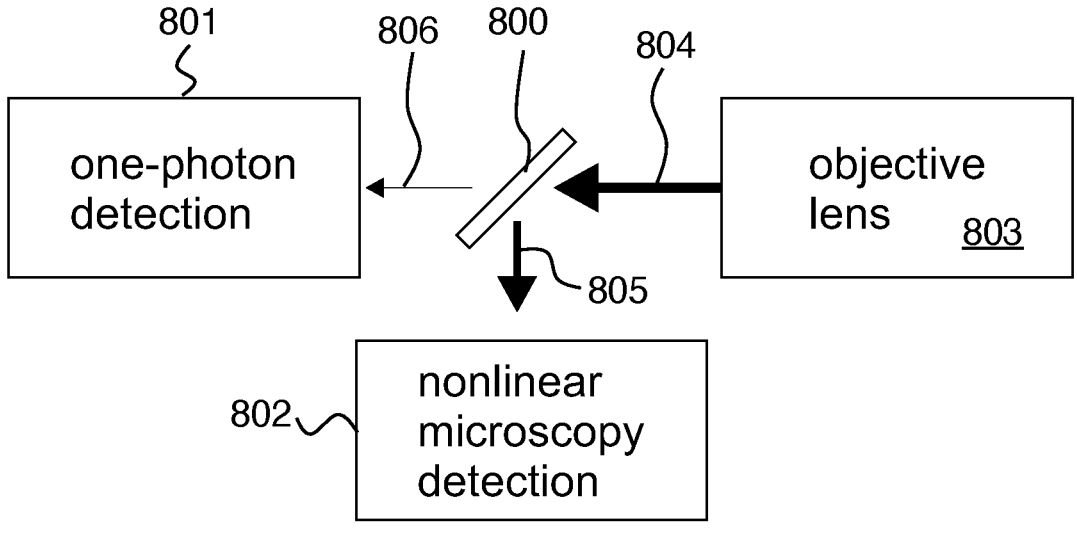
FIG. 8 shows a demultiplexer based on a beam splitter.

F) Demultiplexing Alternatives (FIGS. 7, 8)

FIG. 7 shows a demultiplexer based on a large amplitude galvanometric mirror. Here 700 is a one-photon detection subsystem, 701 is the mirror in a position reflecting fluo-rescence to the one-photon detection, 702 is a mirror motor and shaft, 703 is the mirror rotated in a position reflecting fluorescence light to a nonlinear microscopy detection sub-system, 704 is a beam path for one-photon fluorescence, 705 is a lens or group of lenses after an objective lens, 706 is a fluorescence light beam path coming to the galvanometric mirror, 707 is a fluorescence light induced in a nonlinear microscopy mode, and 708 is a subsystem for nonlinear microcopy detection.

In this embodiment a mirror 702 mounted on a direct current motor is used, preferably a large amplitude galva-nometric mirror. In this case, light coming from the sample, created by either of the modalities of the apparatus is redirected into collection paths of either of modalities by a rapid rotation of the mirror around an axis that is preferably perpendicular to an optical axis of the group of lenses 705.

FIG. 8 shows a demultiplexer based on a beam splitter plate 800 with preferably uneven splitting ratio. Here 801 is the one-photon detection subsystem, 802 is the nonlinear microscopy detection subsystem, 803 is the collection optics and objective lens subsystem, 804 is an arrow representing all fluorescence light coming from the objective and collec-tion system, 805 is an arrow representing graphically an uneven splitting ratio giving equal or more reflection to the nonlinear microscopy detection subsystem, and 806 is an arrow representing an uneven splitting ratio of the fluores-cence light that goes to a one-photon detection subsystem.

In this embodiment, the spatial demultiplexing is achieved with a beam splitter plate 800. The beam splitter plate is made of a transparent material preferably a polished glass or plastic that is coated with a semi-transparent metal-lic or dielectric layer. This embodiment is simpler and most cost-effective at the expense of the optical loss in the collection paths. Light entering either collection path is transmitted or reflected from a beam splitter. Since the number of photons generated in nonlinear microscopy is typically smaller than the number of photons generated in one-photon microscopy it is beneficial to use a beam splitter of uneven splitting ratio, using larger reflectance or trans-mittance together with the nonlinear microscopy collection path and using a smaller fraction of light with the one-photon collection path.

Figure 9:
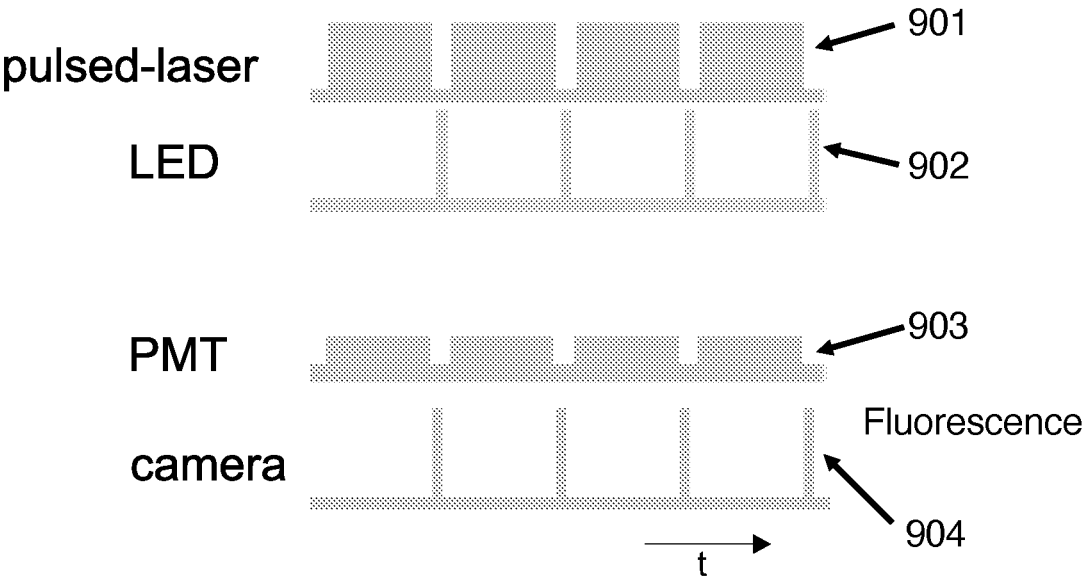
FIG. 9 shows the relation between source excitation and detector activation for the two modalities.

G) System Synchronization (FIG. 9)

FIG. 9 shows a time sequence of operation of excitation sources and detectors. Here 901 is a representation of on-states of the pulsed laser corresponding to the on-state of the nonlinear microscopy phases, 902 shows on-states of the light-emitting diode (LED) corresponding to the on states of the one-photon modality phase, 903 shows time sequence of active acquisition states of the nonlinear-microscopy detec-tor or detectors, such as photomultiplier tubes (PMT) tem-porally aligned to 901, and 904 shows time sequence of active camera acquisition aligned to 902.

Temporal multiplexing is synchronized to a raster scan-ning cycle of the nonlinear microscopy as depicted in FIG. 9. An infrared laser beam 101 is steered in tissue in two lateral dimensions, as exemplified in FIG. 2B, for a certain amount of time, typically between 1 ms to 10 s, preferably 30 ms. After the scanning, a sequence is completed and a nonlinear microscopy image, preferably a two-photon image is acquired, the one-photon image acquisition starts and it lasts between 50 μs to 10 s, preferably shorter than a two-photon frame acquisition time, preferably around 2 ms. This sequence involves switching on and off the following devices used in the apparatus. A pulsed laser beam 101 is switched on and off by a laser beam modulator such as an electro-optical modulator, acousto-optical modulator, a chopper, preferably an electro-optical modulator 103 The light acquisition of the nonlinear microscopy modality is performed on one or more single or multi-pixel detectors, preferably photomultiplier tubes 144, 142 that are single-photon sensitive and whose temporal resolution is shorter than 10 μs. The detectors are preferably switched on only during a laser steering sequence. In the preferred embodi-ment, we use gated photomultiplier tubes. Other types of detectors can be used such as multi-pixel photon counters, hybrid photodetectors, silicon photomultipliers, photodiodes, microchannel plates, and avalanche photodiodes.

The one-photon modality (FIG. 2A) is timed using electronic pulse control of the light source, preferably a LED as well as the synchronization of the acquisition of the camera 132 (on FIG. 1), or 1207 (on FIG. 12) such as CMOS, CCD, EM CCD, sCMOS, ICCD, or a two-dimensional array of detectors that can be used with nonlinear microscopy, microchannel plates, preferably sCMOS camera 132.

Figures 10A, 10B, 10C:
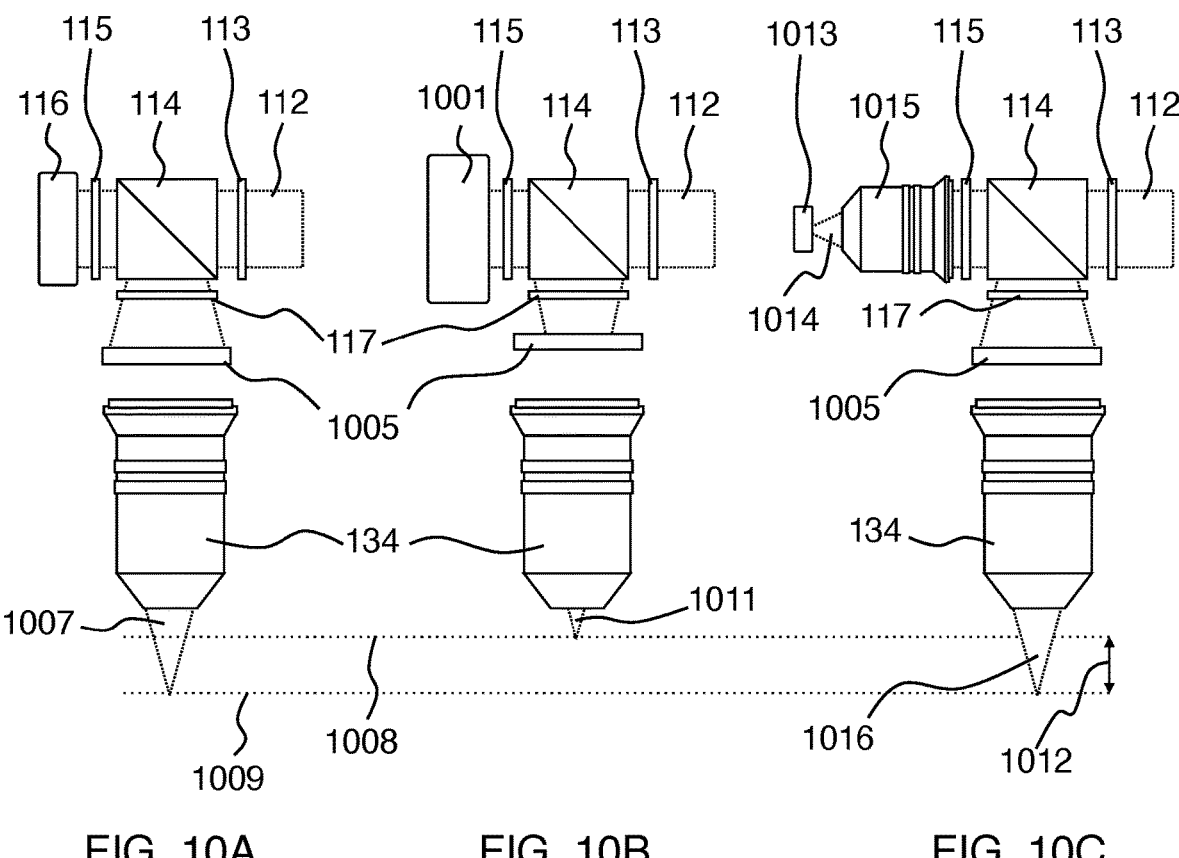
FIGS. 10A-C show several options for providing remote focusing.
Figure 11:
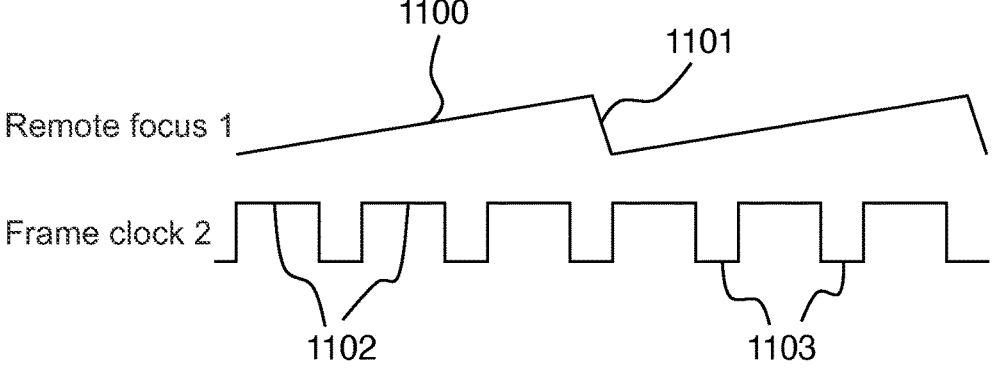
FIG. 11 shows an exemplary timing sequence for remote focusing.

H) Remote Focusing for 3-D Scanning (FIGS. 10A-B, 11)

The steering of a laser beam in the sample in the nonlinear microscopy phase can be two- or three-dimensional. The former case is achieved using one or more flat mirrors whose surface is rapidly tilted, preferably galvanometric mirrors 108.

The steering of the beam in the axial, third dimension can be achieved using a remote focus unit. FIG. 10A shows the remote focus unit of FIG. 1 in a schematic form where 1005 is a block representing a group of relay lenses creating a conjugated image of the deformable mirror 116 close to the back aperture of the objective lens 134. The example of FIG. 10B is similar to the example of FIG. 10A except that deformable mirror 116 is replaced with a liquid crystal spatial light modulator 1001. The example of FIG. 10C is similar to the example of FIG. 10A except that deformable mirror 116 is replaced with a combination of objective 1015 and movable mirror 1013. For example, mirror 1013 can be mounted on a voice coil stage to provide a back-reflection of focused laser beam 1014. The deformable mirror 116 of FIG. 10A is presently the preferred embodiment for remote focusing.

Operation of these three examples is similar. In all cases, adjustment of the remote focus leads to a change in the focal depth (e.g., 1007, 1011, 1016) provided by objective 134 in the sample, as schematically shown by difference 1012 between focal planes 1008 and 1009. In embodiments containing a deformable mirror or a spatial light modulator, the rapid change of focus is achieved through shaping the phase of light as a quadratic function of a beam radius. These two embodiments are also capable of performing an aberration correction by shaping a beam phase into more complex patterns that correspond to the inversed phase acquired by a beam entering the tissue.

FIG. 11 shows an exemplary time-sequence of operation of the remote focus unit with respect to the frame clock. Here 1100 is a time trace representing a depth of imaging vs. time of the non-linear microscopy, 1101 is a fast return of the nonlinear-microscopy imaging depth, 1102 are nonlinear microscopy phases, and 1103 are one-photon microscopy phases. Other operations are possible such as step and settle at each plane, or imaging each plane sequentially.

Figure 12:
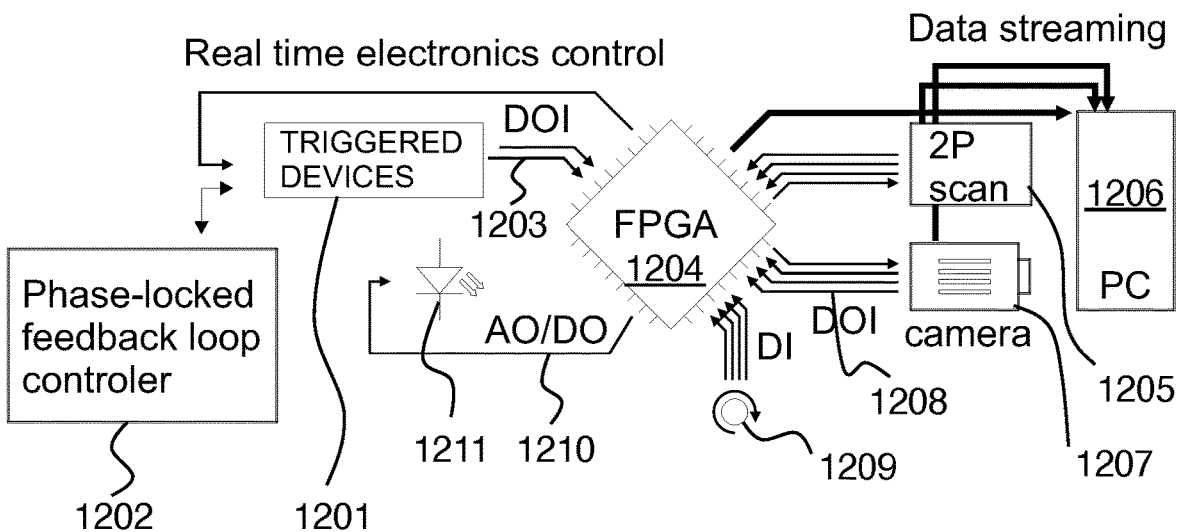
FIG. 12 shows exemplary system electronics.

I) Exemplary Electronics (FIG. 12)

FIG. 12 is an exemplary schematic of the electronic control of the apparatus. Here 1201 includes all electronic devices that provide external trigger inputs and outputs such as gated PMTs, deformable mirror, motor controlling a spinning mirror, laser modulation, LED modulation etc., 1202 is a phase-locked feedback loop controlling the speed and phase of the motor rotating a spinning mirror reading out information about the current rotation phase from the optical measurement using spinning mirror cut-outs, 1203 is a set of digital outputs and inputs (DOI) of the triggered devices, 1204 is one or more field-programmable gate arrays (FPGA) used for electronic control, 1205 is a nonlinear microscopy scanner that includes a set of galvanometric mirrors, 1206 is a computer controller providing a user interface, data acquisition and control, 1207 is a camera for the one-photon modality with its trigger inputs and outputs, 1208 is a set of digital inputs and outputs controlling the camera, 1209 are optional auxiliary devices requiring extra digital inputs or outputs, and 1210 is a set of analog and digital outputs controlling operation of a light emitting diode 1211 (LED 1211 here is also LED 120 on FIG. 1).

Figure 13:
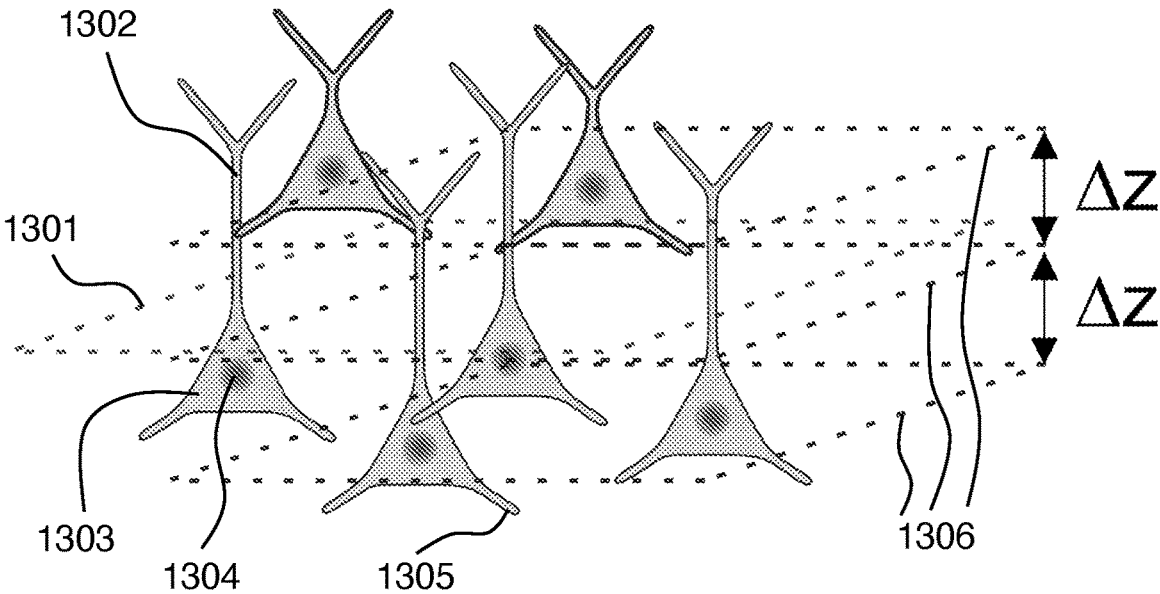
FIG. 13 shows an example of 2-D and 3D imaging of neurons.

J) Example of 3-D Imaging (FIG. 13)

FIG. 13 shows an exemplary application of the remote focus unit to obtain multi-plane images of group of neurons concurrently to their two-dimensional one-photon images. Here 1301 is a one photon imaging plane corresponding to the sharpest focus plane, 1302 is an apical dendrite, 1303 is an imaged neuron, 1304 is the neuron's nucleus, 1305 is a basal dendrite, and 1306 are several imaging planes of nonlinear microscopy.

Figure 14:
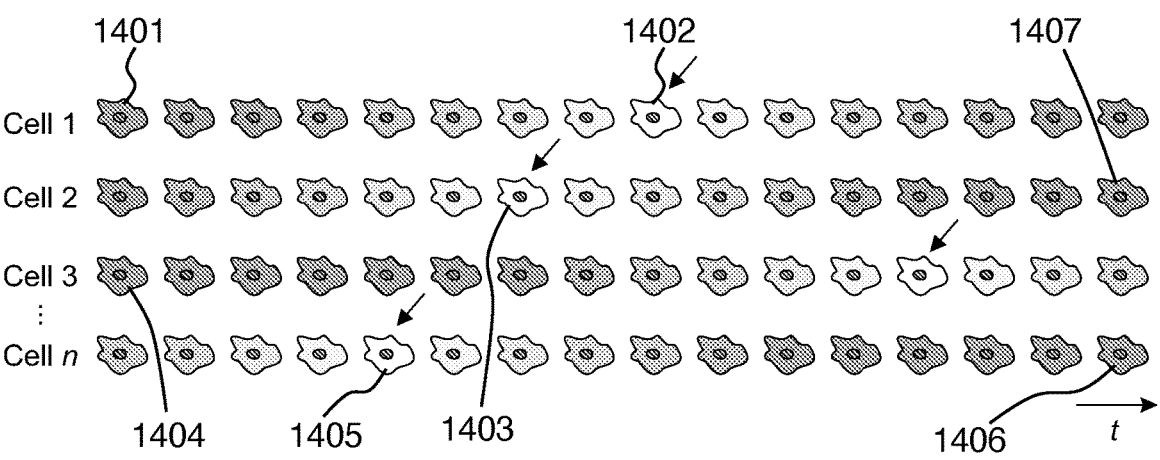
FIG. 14 shows an example of how time dependence of cell activity can help distinguish cells.

K) Example of Temporal Dynamics Used to Distinguish Cells (FIG. 14)

FIG. 14 shows how temporal dynamics can be used to distinguish individual cells of similar morphology.

More specifically, 1401 is cell 1 in an inactive phase, 1402 is cell 1 in an active phase, 1403 is cell 2 in an active phase that precedes 1402, 1404 is cell 3 in an inactive phase that can be morphologically indistinguishable from 1401 based on overlapping position and a lack of morphological details, 1405 is cell n in an active phase that precedes 1402 and 1403, 1406 is cell n in an inactive phase, and 1407 is cell 2 in an inactive phase that is morphologically indistinguishable from 1406.

However, these cells are clearly distinguishable from each other according to the time variation of their activity.

Figure 15:
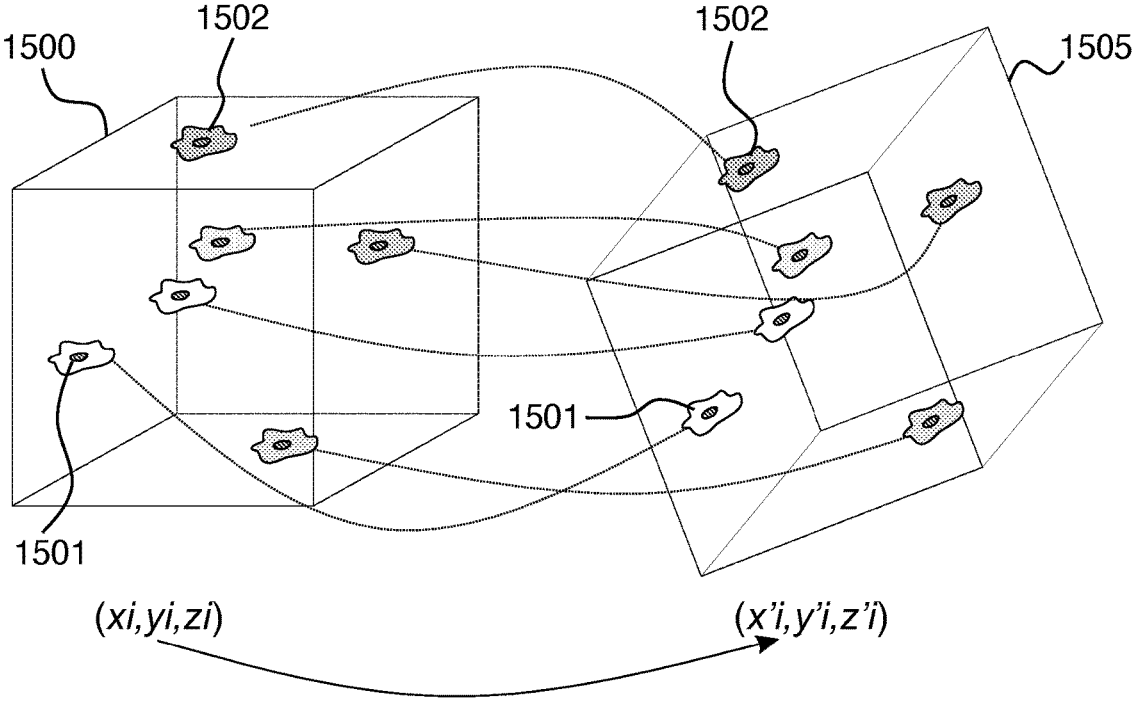
FIG. 15 show an example of how identifying the same cells in two different frames of reference can help determine the relation between the frames of reference.

L) Correcting for Change in Frame of Reference (FIG. 15)

FIG. 15 shows that cells can be identified in three dimensions by their fluorescence properties and morphology (represented by different grayscale intensities), using nonlinear microscopy modality. That allows for the alignment based on characteristic constellation patterns even if frames of references between the measurements are different. Only a few of the cells with characteristic properties can be used to find a geometrical transformation between two frames of references.

More specifically, 1500 is a first frame of reference to look at tissue, 1501 is a first cell, 1502 is a second cell 2, and 1505 is a second frame of reference to look at the tissue. Identification of the same cells in both frames of reference (i.e., 1501, 1502, perhaps more cells as needed) can be used to derive the geometrical transformation relating frames of reference 1500 and 1505 to each other.

Figure 16:
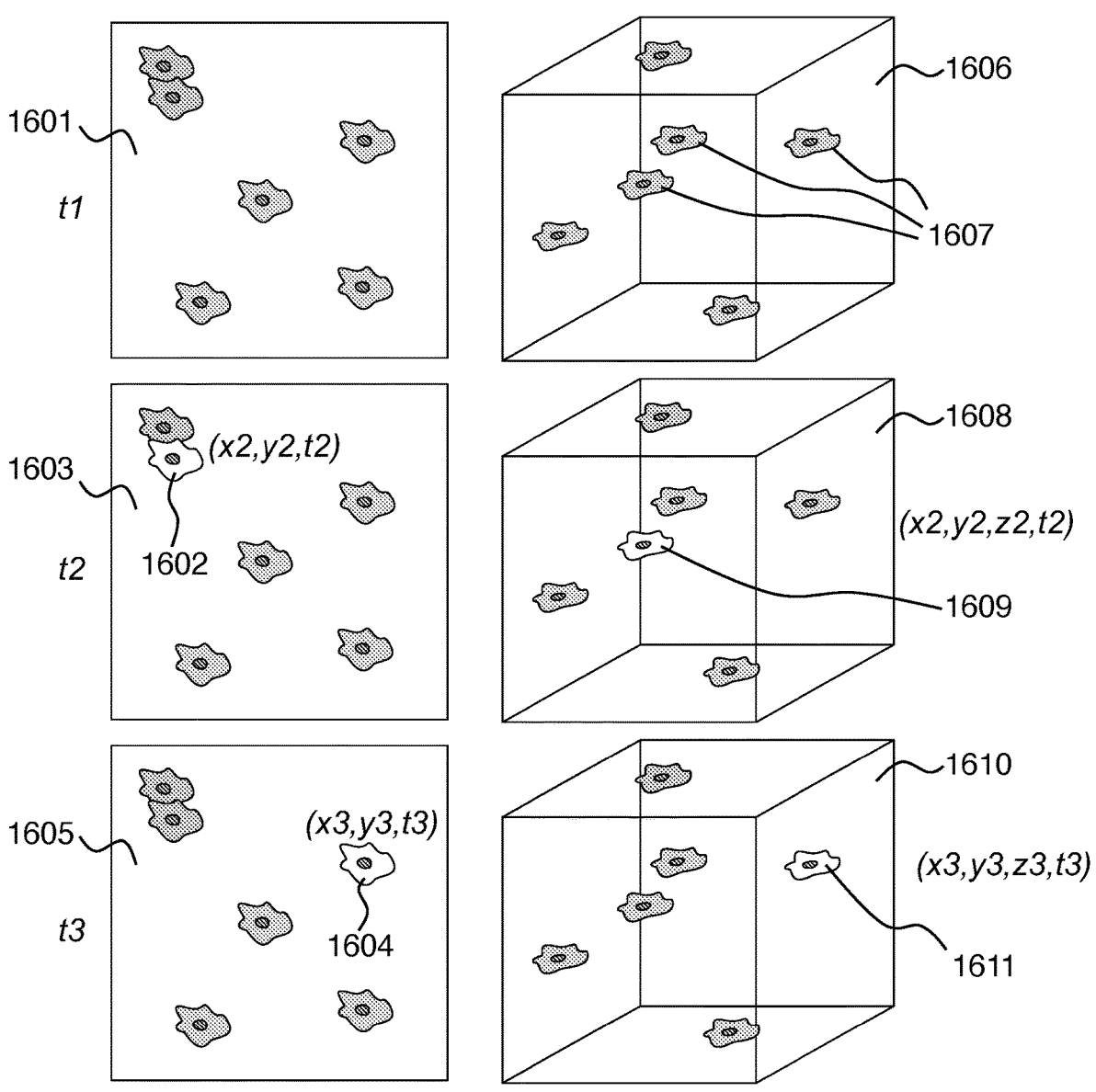
FIG. 16 is an example of using the time dependence of cell activity to help relate 2-D and 3-D images to each other.

M) Use of Time Dependence to Relate 2-D One-Photon Microscopy to 3-D Nonlinear Microscopy (FIG. 16)

Cells can be identified across one-photon and nonlinear microscopy modalities even in three dimensions even if the one-photon data is two dimensional thanks to the temporal changes of their fluorescence. FIG. 16 shows an example of how this can work. The figure presents three time points t1, t2, t3 of a population of cells where cells 1602 and 1609 as well as 1604 and 1611 can be identified as a match between images from both modalities due to their matching intensity varying in time.

More specifically, 1601, 1603, 1605 are one-photon images at times t1, t2, t3 respectively, and 1606, 1608, 1610 are the corresponding 3-D nonlinear microscopy images. Here 1602 is an active cell with coordinates (x2, y2) and unknown depth coordinate at time t2, 1604 is an active cell with coordinates (x3, y3) and unknown depth coordinate at time t3, 1607 is an example constellation of inactive cells that is hard to identify in the view of 1601, 1609 is a cell active during t2, matching with 1602, but having determined all three coordinates (x2, y2, z2), and 1611 is a cell active during t3, matching with 1604, but having determined all three coordinates (x3, y3, z3).

N) Identification of Cells in 3D in Connection with Sample Slicing (FIG. 17)

Figure 17A:
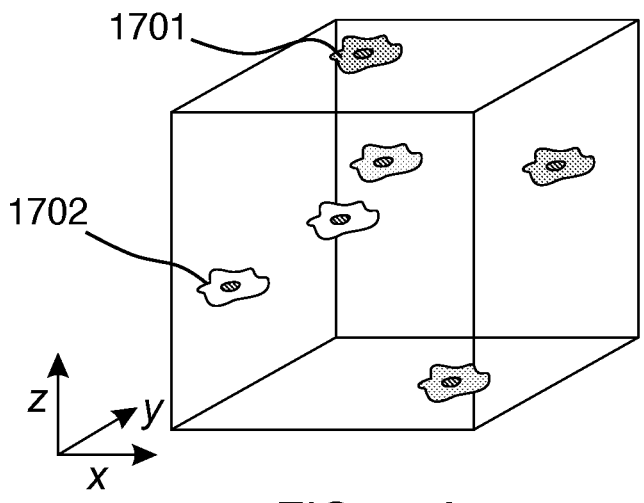
Figure 17B:
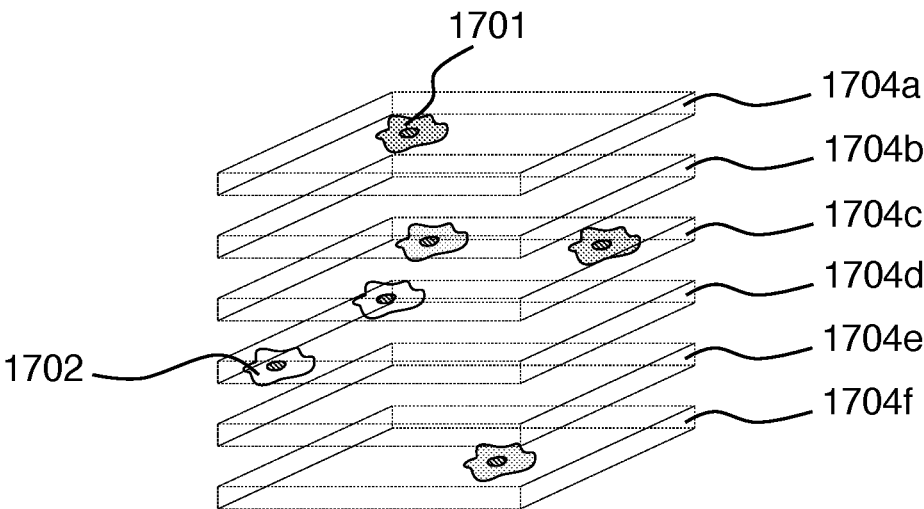
Figure 17C:
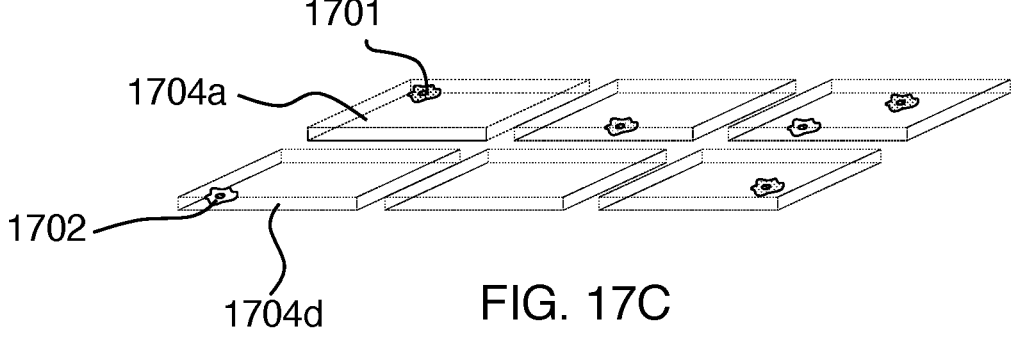

FIG. 17A shows two identified cells 1701 and 1702 in a 3-D sample. FIG. 17B shows slicing of the sample into slices 1704a, 1704b, 1704c, 1704d, 1704e, 1704f (six slices are shown here, but any number of slices may be used in practice). Because of depth information determined as described above, a user can know which slice contains identified cells. In this example, the user would know that cell 1701 is in slice 1704a and cell 1702 is in slice 1704d. FIG. 17C shows the slices spread out, thereby enabling direct access to identified cells (e.g., 1701, 1702) for spatial biology applications.

O) Tissue Alignment Considerations

A method for tissue alignment utilizing the disclosed apparatus is for biological samples whose fluorescence properties undergo dynamic changes, as exemplified in FIGS. 14 and 16. In general, images acquired by one-photon or nonlinear microscopy will have different properties, especially for thick or scattering samples because one-photon microscopy collects both out-of-focus and scattered light without assignment of the light source. Also, one photon images are two-dimensional (FIG. 2A) and in the case of thick tissues or imaging of living organisms, there is no information about the depth of the origin of the collected light. In the applications of the method, such as in spatial biology and its variations, for instance, spatial transcriptomics, exact identification of individual cells is needed. Cells are often imaged in living organisms or live tissue to assess their properties while they live. The spatial biology techniques that are applied to individual cells require tissue segmentation such as close access to the cell is created. Since cells are typically having a similar morphology the identifications of cells need to occur through their spatial coordinates in three dimensions (FIG. 15). Data that are collected from the living tissue or organism recorded using one-photon modality are two dimensional and they are missing third dimension information (FIG. 2A).

The following method allows obtaining the mapping between two-dimensional images and three-dimensional volumes so as each imaged cell is identified and its three-dimensional position is known as depicted in FIG. 16.

While the tissue is live and undergoes dynamic changes, for example as in FIG. 14, whose dynamics are slower than an acquisition frame rate of the disclosed apparatus it can be imaged using the apparatus with one-photon and nonlinear microscopy modalities concurrently. Nonlinear microscopy can acquire either three-dimensional data (FIGS. 2B and 13) or it can acquire two-dimensional data from the plane 1306 that is shifted by a known distance from the focal plane 1301 of the objective lens in the wavelength range of the one-photon microscopy, (FIG. 13). The sequence of repeated recordings that vary the distance between a focal plane and a laser beam focus can effectively create a similar mapping as the concurrent one-photon and three-dimensional nonlinear microscopy imaging.

Figure 18:
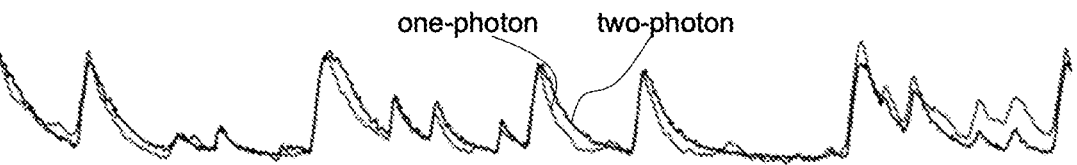
FIG. 18 shows exemplary one-photon and two-photon signal traces from an imaged neuron.
Figure 19:
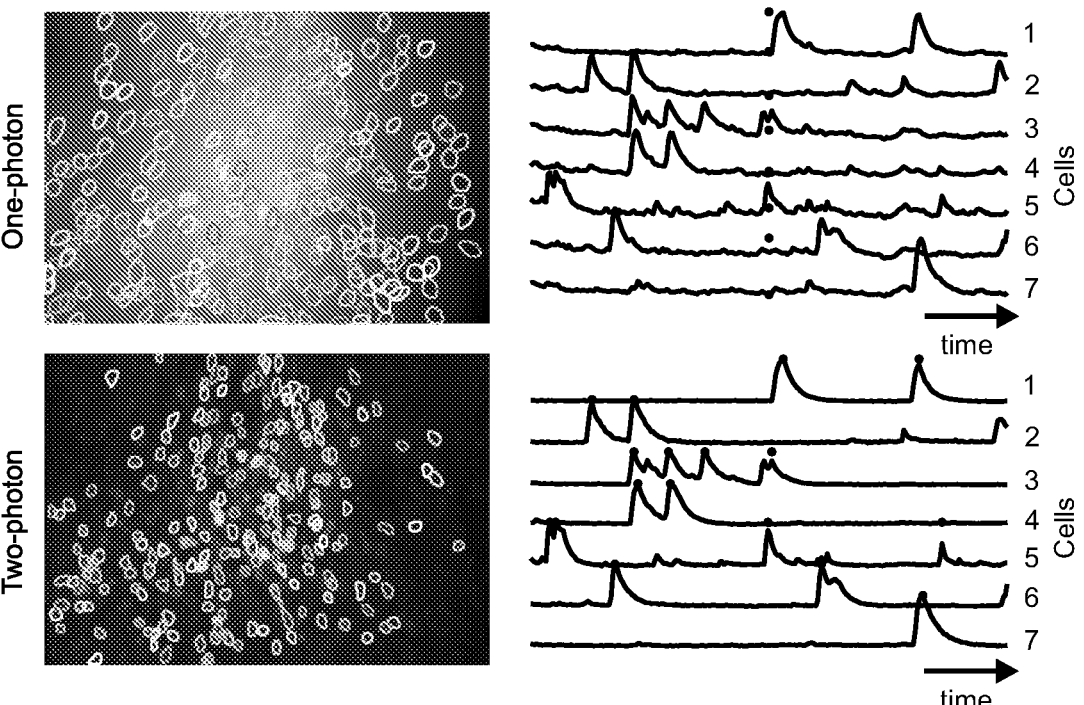
FIG. 19 shows exemplary one-photon and two-photon signal traces and images from imaged neurons.

The mapping is obtained through spatial and temporal correlations of data obtained from either of the modalities as in FIG. 16. First, in each modality independently we identify the cells that undergo dynamic changes. Then sequences of images are segmented in space in such a way that a product of spatial masks and the temporal traces, e.g. FIGS. 18, 19, is close to the original sequence of images. Then we calculate the correlation coefficient between all the cells segmented from both modalities. From the independent calibration of magnification and rotation, translation parameters that link one-photon, and nonlinear microscopy, we additionally obtain information about a spatial overlap between cells in two dimensions in both modalities. Cells whose time traces have the highest correlation coefficients and have shapes that overlap in two dimensions across modalities are identified as the matched cells. The matched cells are assumed to be images of the same cells in the organism and their two-dimensional positions obtained in one photon imaging now have the corresponding three-dimensional position obtained through nonlinear microscopy.

This method enables an alignment of tissue acquired in a setting where precise, high-resolution 3D microscopy is not possible (e.g. in a hospital, at patient's home, animal that is freely moving) where we can identify the cells based on their function in that place e.g. using a portable imaging device. Then we can repeat the same modality of imaging using the apparatus (e.g. in the lab)—that will share properties of the previous image but this time the series of images will be acquired concurrently to high-resolution nonlinear microscopy, creating three-dimensional structure that can be mapped to a two-dimensional set of images (FIG. 16). In the end three-dimensional tissue structure can be aligned to the image of the tissue structure before slicing (FIGS. 15 and 17). The alignment procedure can be applied for the spatial biology purposes where we can link function of the cells identified in the conditions where nonlinear microscopy cannot be applied to the cells identified in a tissue after slicing before e.g. multiomics applications. The steps of alignment are following 1) acquire series of images using linear fluorescence microscopy in the conditions where nonlinear microscopy cannot be applied; 2) repeat measurements of the same part of tissue using the apparatus acquiring concurrently linear-fluorescence and nonlinear-microscopy images; 3) align 2D images between 1) and 2); 4) Align 2D and 3D images acquired using the apparatus; 5) prepare tissue for slicing; 6) image tissue before slicing in 3D; 7) align cells in 3D between 6) and 2); 8) Slice the tissue enabling access needed for spatial biology preserving information about coordinates of cells; 9) Create a mapping between cells in individual slices of tissue (FIG. 17C) and those that have been acquired using linear microscopy in a setting when nonlinear-microscopy could not be applied.

P) Spatial Maps and Time Traces of Neuron
Dynamics (FIGS. 18 and 19)

FIG. 18 shows exemplary time traces of single-neuron calcium dynamics obtained using multiplexed one-photon and two-photon nonlinear microscopy.

FIG. 19 shows exemplary spatial maps and time traces of neuron calcium activity imaged using multiplexed one-photon and two-photon nonlinear microscopy. More specifically, in the experiment of FIG. 19, we used a combination of one-photon and two-photon imaging of neurons in a living mouse. Neurons expressed a green fluorescence indicator of calcium concentration that was dynamically changing in the event of cells firing.

The invention claimed is:

1. Apparatus comprising:
a linear optical microscope having a first optical beam path from a first source to a first detector, and configured to provide a first image of a sample;
a nonlinear optical microscope having a second optical beam path from a second source to a second detector and configured to provide a second image of the sample;
wherein the first optical beam path and the second optical beam path overlap each other in part such that the first image of the sample and the second image of the sample are inherently co-aligned to each other, wherein an overlapping part of the first optical beam path and the second optical beam path includes a common objective lens for linear and nonlinear imaging;
a microscope controller configured to demultiplex the first optical beam path and the second optical beam path, whereby co-aligned linear and nonlinear optical microscopy of the sample is provided.

2. The apparatus of claim 1, further comprising a spectral filter disposed in a beam path from the first and second optical sources to the sample and configured to:
i) transmit a linear excitation band,
ii) transmit a nonlinear excitation band and
iii) reflect a fluorescence band;
wherein the linear excitation band, the nonlinear excitation band and the fluorescence band are spectrally distinct from each other.

3. The apparatus of claim 1, further comprising a rotatable mirror disposed in a beam path from the sample to the first and second detectors and having one or more demultiplexing cut-outs, wherein rotation of the rotatable mirror switches light received from the sample between the first and second detectors according to whether or not a demultiplexing cut-out is in the beam path.

4. The apparatus of claim 3, wherein light passing through the one or more demultiplexing cutouts of the rotatable mirror is received by the first detector, and wherein light reflected by the rotatable mirror is received by the second detector.

5. The apparatus of claim 3, wherein the rotatable mirror further comprises one or more phase-lock features configured to enable phase locking of the rotatable mirror to a system phase reference.

6. The apparatus of claim 1, wherein the microscope controller is configured to switch between
a first mode with the first source and first detector being active and the second source and second detector being inactive, and
a second mode with the second source and second detector being active and the first source and first detector being inactive.

7. The apparatus of claim 1, wherein the nonlinear optical microscope further comprises a remote focuser configured to adjust a depth of nonlinear excitation in the sample provided by the common objective lens.

8. The apparatus of claim 7, wherein the depth of nonlinear excitation in the sample is configured to be automatically adjusted by the microscope controller, whereby a depth-scan capability is provided for the nonlinear microscope.

9. The apparatus of claim 8, wherein the depth-scan capability is combined with a 2-D scan capability to provide a 3-D scan capability for the nonlinear microscope.

10. A method of multiplexing linear-fluorescence microscopy and nonlinear microscopy comprising:
performing linear-fluorescence microscopy and nonlinear microscopy with the apparatus of claim 1 to acquire one or more linear-fluorescence images and one or more nonlinear images.

11. The method of claim 10, wherein the sample is a 3D sample including biological cells.

12. The method of claim 11, further comprising identifying one or more individual biological cells in the sample according to their linear and/or nonlinear responses.

13. The method of claim 12, wherein the one or more linear-fluorescence images are 2D images, wherein the one or more nonlinear images is a 3D nonlinear image, and further comprising determining a 2D to 3D mapping of the 2D linear-fluorescence images of the sample at various depths to the 3D nonlinear image of the sample.

14. The method of claim 13, further comprising:
obtaining an initial linear-fluorescence image of the sample via conventional fluorescence microscopy;
aligning the initial linear-fluorescence image to the 2D linear-fluorescence images; and
using the 2D to 3D mapping to provide depth information for features in the initial linear-fluorescence image.

15. The method of claim 13 further comprising slicing the sample to isolate a target cell according to depth information of the target cell provided by the 2D to 3D mapping.

* * * * *